United States Patent Office 3,201,442
Patented Aug. 17, 1965

3,201,442
PROCESS FOR PREPARING THE N-MONOMETHYLAMIDE OF O,O-DIMETHYLDITHIOPHOSPHORYLACETIC ACID
Cesare Augusto Peri, Milan, Italy, assignor to Montecatini Società Generale per l'Industria Mineraria e Chimica, Milan, Italy
No Drawing. Filed Dec. 24, 1962, Ser. No. 246,680
Claims priority, application Italy, Dec. 28, 1961, 23,426/61
2 Claims. (Cl. 260—461)

My invention relates to a process for preparing crystalline N-monomethylamide of O,O-dimethyldithiophosphorylacetic acid in a particularly high purity degree by amidation of an alkyl or aryl ester of the O,O-dimethyldithiophosphorylacetic acid with monomethylamine.

The reaction leading to formation of amides of an organic acid by reaction of the corresponding alkyl or aryl ester with amines is known. This reaction theoretically may also be employed for preparing compounds belonging to the class of alkylamides of O,O-dialkyldithiophosphorylacetic acids. In practice, however, it has been ascertained that only when having recourse to particular expedients and while observing precise operative conditions is it possible to obtain satisfactory results. This is due to the fact that side reaction readily occur between the reactants, per se, and between the reactants and the finished product and the reaction medium.

N-monomethylamide of O,O-dimethyldithiophosphorylacetic acid may be prepared according to the equation:

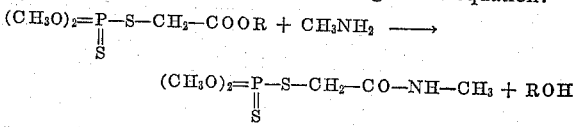

wherein R is alkyl or aryl.

The reaction may be carried out in the presence of an organic solvent or, preferably, in order to obtain a product with a relatively high degree of purity, in aqueous medium or in water-soluble medium at temperatures between $-15°$ C. and $+10°$ C. It was ascertained that the reaction course is more favorable when the reaction mass is kept at a uniformly constant temperature. It was also ascertained that a high purity product is obtained with difficulty since the impurities are dissolved at least partially in the common solvents together with the finished products. Owing to the impurities contained therein, the technical product generally has a titer between 95 and 97% of N-monomethylamide of O,O-dimethyldithiophosphorylacetic acid.

Products of higher degree of purity may be obtained by recrystallization from solvents or water or by fractionated crystallization of the product in the melted state, according to known expedients. The production cycle, of course, becomes more complex and expensive. In the industrial production of this product it is of great importance, as already stated, that the desired temperature be kept constant in the entire reaction mass. While in the laboratory or in reduced scale production, no difficulty is encountered in uniformly maintaining the desired temperature in the while mass, in the large scale production it is difficult to avoid the occurrence of local temperature increases beyond the desired limits, unless the reaction time is excessively prolonged or recourse is made to complex and expensive equipments. For this reason, the results obtained in laboratory prove to be slightly better than those obtained in industrial scale.

An object of my invention is to provide a process for preparing the N-monomethylamide of O,O-dimethyldithiophosphorylacetic acid by amidation of an alkyl or aryl ester of O,O-dimethyldithiophosphorylacetic acid with the monomethylamine, which overcomes the above difficulty.

I have found that the amidation reaction proceeds best when it is operated in a reaction medium which does not react with reaction substances or with finished products and shows a boiling point, at the operating pressures, between $-15°$ C. and $+10°$ C., preferably near $0°$ C. ($+2$ to $-2°$ C.). I keep the temperature in the reaction mass uniformly constant by evaporation and condensation of (A) a substance or (B) of a mixture of substances which react with neither reagents nor with final product and have a boiling point, under working pressures, comprised between $-15°$ C. and $+10°$ C. The working pressure may vary between 20 mm. Hg and 30 atm. The following are illustrative of medium suitable in accordance with our invention: butane (B.P. $-0.5°$), $CCl_3CF_3$ (B.P. $-2°$ C.), a mixture of 79.5% $CCl_3F$ and 20.5% $CCl_2F_2$ (B.P. about $2°$ C.), methylcyclopropane (B.P. $0°$ C., under 700 mm. Hg), dichlorodifluormethane (B.P. $0°$ C., under 3.5 atm.), propane (B.P. $1.5°$ C., under 5 atm.), perfluorobutane (B.P. $0°$ C., under 800 mm. Hg), 2-methylpropane (B.P. $0°$ C., under 1000 mm. Hg), $C_2H_5Cl$ (B.P. $-3.9$, under 400 mm. Hg), $CH_3Cl$ (B.P. $-6°$ C., under 2 atm.).

As is apparent from what has been stated above, it is an object of my invention to provide a means for carrying out the amidation reaction under the most profitable conditions; a further object is to obtain directly a finished crystalline product of high purity through a simple process.

Among the compounds (A) which may be employed for carrying out this invention, butane is particularly suitable, which has a boiling point $0.6°$ C. under atmospheric pressure and while compatible with the organic products allowed to react, displays practically no solvent power towards the finished product, the raw materials, the intermediates and the impurities.

One embodiment of my process consists in reacting in the presence of liquid butane, in a vessel equipped with stirrer and refluxing condenser (wherein liquid ammonia is circulated), the methyl etser of O,O-dimethyldithiophosphorylacetic acid with monomethylamine in aqueous solution in the proportion of one mole ester for 1–1.5 moles amine while gradually introducing the amine. The temperature of about $0°$ C. is kept by the boiling butane. The N - monomethylamide of O,O-dimethyldithiophosphorylacetic acid which is gradually formed separates in the crystalline state. At reaction end, a semi-solid mass occurs in the vessel, which may be suitably made fluid by addition of water cooled at a temperature near $0°$ C. The excess amine is subsequently neutralized with diluted $H_2SO_4$ solution, kept at $0°$ C., until the pH 6.5–7 is reached. When this operation is accomplished, the finished product is separated by filtration from the butane-water suspension. The N-monomethylamide of O,O-dimethyldithiophosphorylacetic acid is obtained in crystals which after drying has a titer of 98–98.5%.

According to another embodiment of the present invention, the butane is removed by distillation of the water-butane suspension at temperature not higher than $2°$ C. Residue is centrifuged and the product obtained is dried in the air.

According to the present invention instead of a single compound, mixtures made up of two or more compounds inert toward the reacting substances and which have, under the working conditions, a boiling point between $-150°$ C. and $+10°$ C., may be employed. Thus for instance, a mixture containing 79.5%, $CCl_3F$ (B.P. $+23°$ C.) and 20.5% $CCl_2F_2$ (B.P. $-29°$ C.) boils under atmospheric pressure at $-2°$ C. This mixture is particularly suitable for the purpose, since it is a solvent of the methyl ester of O,O-dimethyldithiophosphorylacetic acid, of the amine, of the substances constituting the impurities of the ester, however, not a solvent for the finished product. Production process wherein the indicated means is employed is analogous to the above described operative cycle while, however, affording remarkably better results. Finished product titer is in this case 99.5–99.8% of N-monomethylamide of O,O-dimethyldithiophosphorylacetic acid. The product is crystalline and occurs in needles having a bright yellowish color. Another advantage offered by employment of products belonging to the class of chlorofluoro-methanes is the increased safety due to their nonflammability.

The following examples are merely to illustrate this invention, but not to limit the scope thereof.

*Example 1*

750 ml. of butane are introduced in a 3-liter, 3-necked flask equipped with stirrer, plunging thermometer, 250 ml. tap funnel and refluxing condenser wherein liquid ammonia is circulated. 460 g. (2 moles) of 97% methyl ester of O,O-dimethyldithiophosphorylacetic acid are then introduced into the liquid at boiling temperature. In the vigorously stirred, heterogeneous mixture, 216 g. of a 34.3% (2.4 moles) aqueous solution of monomethylamine are introduced through the charge funnel. The introduction of monomethylamine occurs gradually within two hours, while the temperature is kept always at about 0° C. by the boiling butane. After having introduced about 140 ml. monomethylamine solution the separation begins, in the crystalline state, of the monomethylamide of O,O-dimethyldithiophosphorylacetic acid. When the introduction of amine is ended, the reaction mass is stirred for an additional two hours always in boiling butane, then 250 ml. water cooled at about 0° C. are added to the semisolid mass. Subsequently, the amine excess is neutralized by adding about 290 ml. of 7.5% $H_2SO_4$ solution previously cooled at 0° C., until a pH between 6.5 and 7 is reached. When neutralization is completed, the refluxing condenser is replaced by a descending condenser and the butane is removed by distillation, until the temperature within the flask reaches 2° C. The last traces of butane are then removed by aspiration under vacuum. The residue is centrifuged and then dried in the air at room temperature. After 70 hours of drying, 355 g. of monomethylamide of O,O-dimethyldithiophosphorylacetic acid are obtained, with solidification point of 48.4° C. Arsenometric titer (method of Fusco, Marchese, Placucci, Losco: "La Chimica e l'Industria," 42, 1960, 337) of the finished product is 97.51%; the amide nitrogen titer is 98.76%.

*Example 2*

Carried out as in Example 1, except for the neutralization with $H_2SO_4$, the butane-water suspension is centrifuged and the solid product is dried in the air at room temperature. After drying for 70 hours, 360 g. of monomethylamide of O,O-dimethyldithiophosphorylacetic acid are obtained, with a melting point of 49.2° C. Arsenometric titer of the obtained product is 98.28%, the amide nitrogen titer is 98.90%.

*Example 3*

Carried out as in Example 2, with the exception that the butane is replaced with a mixture made up of 79.5% $CCl_3F$ and 20.5% of $CCl_2F_2$. The mixture, which shows a boiling point −2° C., entirely dissolves the methyl ester of O,O-dimethyldithiophosphorylacetic acid whereby the ester amidation is carried out in solution and not in suspension as in the preceding tests. 366 g. of monomethylamide of O,O-dimethyldithiophosphorylacetic acid are obtained, with a melting point of 49.1° C. The product obtained has an arsenometric titer 99.68% and an amide nitrogen titer of 99.15%.

*Example 4*

Carried out as described in Example 1, except that the butane is replaced with propane and the amidation reaction is carried out under pressure of 5 atmospheres so as to keep the temperature at about 0° C. The propane is then recovered by distillation, while always operating at 0° C. Separation of monomethylamide of O,O-dimethyldithiophosphorylacetic acid is accomplished according to the modalities mentioned in Example 1. 350 g. of monomethylamide of O,O-dimethyldithiophosphorylacetic acid are obtained, having a solidification point of 48° C. Arsenometric titer is 97.4% and the amide nitrogen titer is 98.5%.

*Example 5*

Carried out as in Example 3, with the exception that the reaction medium is constituted of a mixture having the following composition: $CCl_3F$ 90% and $CCl_2F_2$ 10%. This mixture has a boiling point +10° C. and dissolves entirely both the methyl ester of O,O-dimethyldithiophosphorylacetic acid and the reaction byproducts, whereby the ester amidation occurs in solution and not in suspension as in the tests described in Examples 1 and 2. 250 g. of monomethylamide of O,O-dimethyldithiophosphorylacetic acid are obtained, having solidification point of 49° C. Arsenometric titer of the product obtained is 98.2% and the amide nitrogen titer is 98%.

Obviously many modifications and variations of the present invention are possible in the light of the above teachings. It is therefore to be understood that within the scope of the appended claims, the invention may be practiced otherwise than as specifically described.

I claim:

1. In a process for preparing the N-monomethylamide of O,O-dimethyldithiophosphorylacetic acid by reacting monomethylamine with an alkyl ester of O,O-dimethyldithiophosphorylacetic acid, the improvement which comprises carrying out the reaction in a medium consisting of a mixture of organic chlorofluorinated methane compounds, said mixture being unreactive with the reactants and with the end product and having a boiling point, at the reaction conditions between −15 and +10° C., continuously evaporating and condensing said medium to maintain a constant temperature during the course of the reaction.

2. In a process for preparing the N-monomethylamide of O,O-dimethyldithiophosphorylacetic acid by reacting monomethylamine with alkyl ester of O,O-dimethyldithiophosphorylacetic acid, the improvement which comprises carrying out the reaction in a medium consisting of a mixture of 79.5% $CCl_3F$ and 20.5% $CCl_2F_2$, continuously evaporating and condensing said medium to maintain a constant temperature during the course of the reaction.

References Cited by the Examiner

UNITED STATES PATENTS 2,484,384  10/49  Levine et al. _____ 260—93.7 XR
3,032,579  5/62   Losco et al. _____ 260—461.112

CHARLES B. PARKER, *Primary Examiner.*